(12) United States Patent
Shah et al.

(10) Patent No.: US 11,070,495 B2
(45) Date of Patent: Jul. 20, 2021

(54) SYSTEMS AND METHODS FOR A CHATBOT COMMUNICATION FRAMEWORK

(71) Applicant: Dish Network L.L.C., Englewood, CO (US)

(72) Inventors: Rima Shah, Broomfield, CO (US); Sheshank Kodam, Aurora, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 248 days.

(21) Appl. No.: 16/270,424

(22) Filed: Feb. 7, 2019

(65) Prior Publication Data

US 2020/0213251 A1 Jul. 2, 2020

Related U.S. Application Data

(60) Provisional application No. 62/785,983, filed on Dec. 28, 2018.

(51) Int. Cl.
*H04L 12/58* (2006.01)
*G06N 20/00* (2019.01)
*H04L 29/06* (2006.01)

(52) U.S. Cl.
CPC .............. *H04L 51/02* (2013.01); *G06N 20/00* (2019.01); *H04L 51/32* (2013.01); *H04L 63/10* (2013.01); *H04L 63/1441* (2013.01)

(58) Field of Classification Search
CPC ......... G06N 20/00; H04L 51/02; H04L 51/32; H04L 63/10; H04L 63/1441
See application file for complete search history.

(56) References Cited

U.S. PATENT DOCUMENTS

| | | | |
|---|---|---|---|
| 2011/0270719 A1* | 11/2011 | Hollars | G06Q 30/02 705/30 |
| 2014/0337139 A1* | 11/2014 | Thomas | G06Q 30/0269 705/14.66 |
| 2016/0337286 A1* | 11/2016 | Bastide | H04L 51/14 |
| 2019/0098112 A1* | 3/2019 | Young | G06Q 50/01 |
| 2019/0140986 A1* | 5/2019 | Anderson | H04L 67/104 |
| 2019/0207878 A1* | 7/2019 | Myung | G06F 16/3329 |
| 2019/0312831 A1* | 10/2019 | Gupta | H04L 9/3236 |
| 2019/0370629 A1* | 12/2019 | Liu | G06F 40/30 |
| 2019/0392285 A1* | 12/2019 | Manaharlal Kakkad | G06F 40/30 |
| 2020/0162448 A1* | 5/2020 | Dasika Venkata Devi | H04L 67/10 |

* cited by examiner

*Primary Examiner* — William G Trost, IV
*Assistant Examiner* — Christopher P Cadorna
(74) *Attorney, Agent, or Firm* — Seed IP Law Group LLP

(57) ABSTRACT

Systems and methods for a chatbot communication framework, which solves the problems of hacker chatbots, identity theft, transmission of corrupt data and related technological issues by providing an integrated framework for communication between chatbots that otherwise use various different unique standards and rules and authentication procedures. This improves the operation of chatbot computing systems by increasing speed and efficiency of electronic communication between such systems and increasing security of such systems by preventing identity theft and transmission of corrupt data.

21 Claims, 7 Drawing Sheets

SYSTEMS AND METHODS FOR A CHATBOT COMMUNICATION FRAMEWORK

TECHNICAL FIELD

The technical field relates to electronic communications and more particularly, to automated electronic communications with chatbots.

BRIEF SUMMARY

A chatbot (also known as a bot, smartbot, talkbot, chatterbot, instant messaging (IM) bet, interactive agent, conversational interface or artificial conversational entity) is a computer system running a computer program or an artificial intelligence or machine learning system which conducts a conversation via auditory or textual methods. Such programs are often designed to convincingly simulate how a human would behave as a conversational partner, thereby passing the Turing test in some instances. Chatbots are typically used in dialog systems for various practical purposes including customer service or information acquisition. Some chatbots use sophisticated natural language processing (NLP) systems, but many simpler systems scan for keywords within the input, then pull a reply with the most matching keywords, or the most similar wording pattern, from a database. Chatbots may be integrated with, communicate with or communicate via various messaging applications, for example, including, but not limited to: Facebook® messenger; Instagram®; Whatsapp®; Flixpert®; Wechat®; Line®; Snapchat®; KakaoTalk®; Skype®, other Internet, web-based, instant messaging or chat applications; and/or other wireless mobile device chat or messaging applications.

However, hundreds of chatbots are developed and managed by individual entities, which makes it difficult to manage chatbot communications in terms of standards like rules, language, communication and security. Authentication procedures across chatbots are different, which makes it extremely complicated to develop and maintain validation logic for communicating with multiple chatbots. One-to-one communication between individually maintained chatbots can often lead to identity theft and transmission of corrupt data. Therefore, disclosed herein are systems and methods for a chatbot communication framework, which solves the above problems by providing an integrated framework for communication between chatbots that otherwise use various different unique standards and rules and authentication procedures. This improves the operation of chatbot computing systems by increasing speed and efficiency of electronic communication between such systems and increasing security of such systems by preventing identity theft and transmission of corrupt data.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
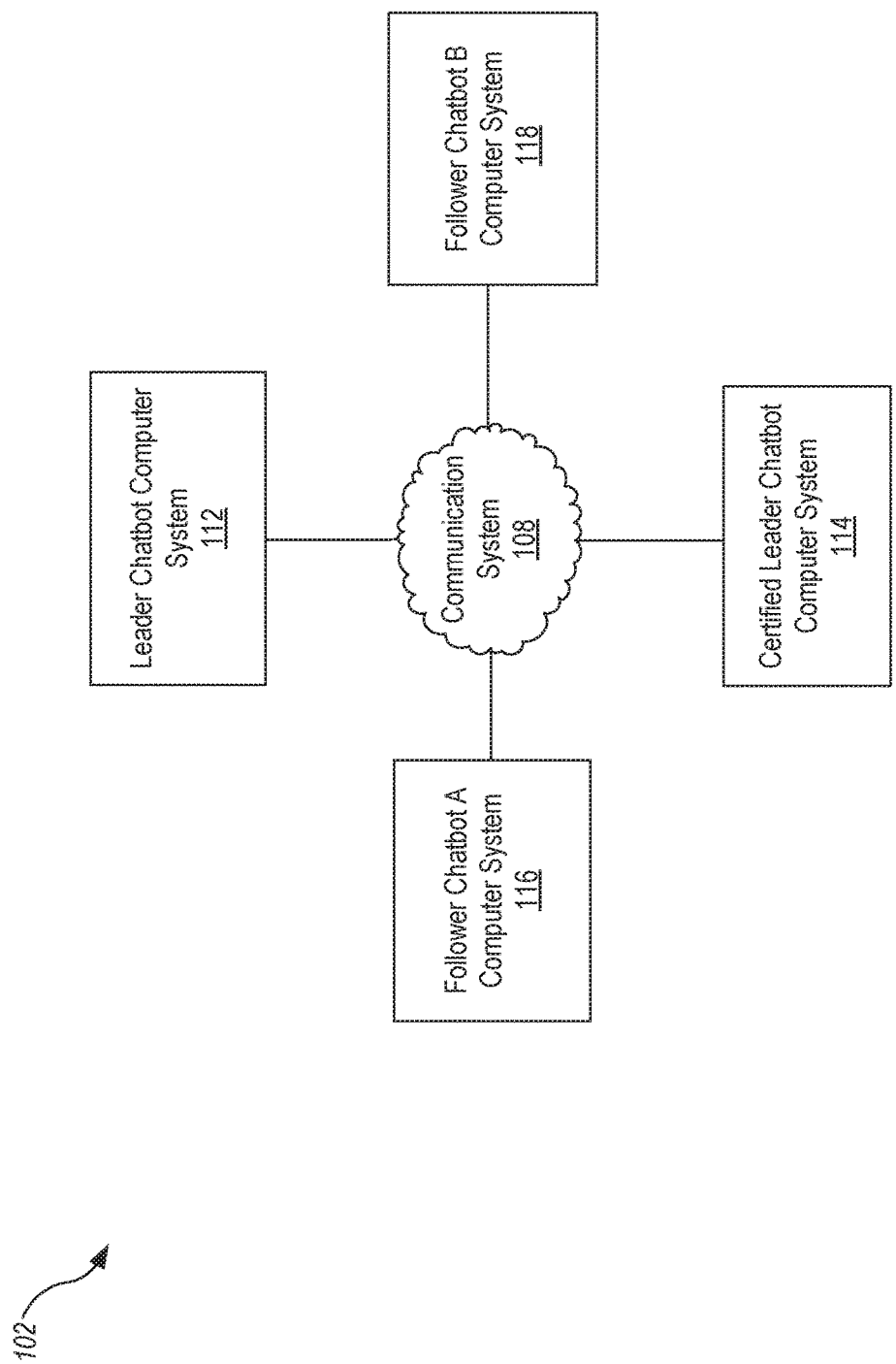
FIG. 1 is a block diagram illustrating an example networked environment in which embodiments of systems and methods for a chatbot communication framework may be implemented, according to one embodiment.

FIG. 1 is a block diagram illustrating an example networked environment 102 in which embodiments of systems and methods for a chatbot communication framework may be implemented.

Shown in FIG. 1 is a leader chatbot computer system 112, a certified leader chatbot computer system 114, a follower chatbot A computer system 116 and a follower chatbot B computer system 118, each operably connected to each other via communication system 108. Follower chatbots (e.g., respective chatbots running on follower chatbot A computer system 116 and follower chatbot B computer system 118) communicate with each other through a leader (e.g., a leader chatbot running on leader chatbot computer system 112) or certified leaders (e.g., a certified leader chatbot running on certified leader chatbot computer system 114). The leader or certified leader chatbots store the rules and standards for each of the follower bots. When a message is sent from a follower chatbot (such as from the chatbot system running on follower chatbot A computer system 116) to another follower chatbot (such as to the chatbot system running on follower chatbot B computer system 118), the leader chatbot (such as the leader chatbot system running on leader chatbot computer system 112) will verify if the message has met the rules and standards. The leader chatbot assigns a noncompliance point (also referred to herein as negative karma) to the follower chatbot if a message does not meet the standards. Such improvements are used for detecting hackers, identity theft and corrupt data transmissions.

The follower chatbot A computer system 116 and the follower chatbot B computer system 118 may each be any device that is capable of communicating electronically with the other. For example, such electronic communication may include, but is not limited to one or more of: text messaging; Short Message Service (SMS) communication; communication using standardized phone protocols defined as part of the Global System for Mobile Communications (GSM) series of standards for sending text messages to and from GSM mobile handsets; communication via the American National Standards Institute (ANSI) code division multiple access (CDMA) networks and Digital Advanced Mobile Phone System (AMPS); communication via the International Mobile Telecommunications-2000 (IMT-2000) specifications by the International Telecommunication Union (3G); communication via the International Mobile Telecommunications-Advanced (IMT-Advanced Standard or "4G"); satellite and landline networks communication via any standardized communication protocols to allow fixed line or mobile phone devices to exchange text messages; Multimedia Message Service (MMS) communication; Internet communications; electronic mail (email), instant messaging (IM); online chat, web chat; Internet Relay Chat (IRC); communication via any application layer protocol that facilitates communication in the form of text; voice-to-text communication applications; text-to-voice communication applications; real-time communication between two users via an electronic communication device; real-time communication between two users via accessible web interfaces; real-time communication between two users via one or more mobile device applications; etc. Online chat may refer to any kind of communication over the Internet that offers a real-time or near real-time transmission of text messages from sender to receiver. Online chat may include web-based applications or native applications running on a mobile device or other type of computing device that allows communication between users in a multi-user environment over the Internet or other communications channel.

Examples of what the follower chatbot A computer system 116 and the follower chatbot B computer system 118 are in various embodiments include, but are not limited to, one or more of: a computer, a notebook computer, a laptop computer, a tablet computer, a personal digital assistant, a telephone, a cellular telephone, a mobile device, a mobile handset, a smartphone, an iPhone® mobile device, a Samsung® mobile device, an Android® mobile device, a Windows® mobile device, a Blackberry® mobile device, another smartphone and/or tablet device, a watch, a wearable device, a media player, a gaming console, a television converter, a set-top box, a television receiving device, a television recording device, a satellite set-top box, a satellite receiving device, a cable set-top box, a cable receiving device, a television tuner, etc.

The leader chatbot computer system 112, certified leader chatbot computer system 114, follower chatbot A computer system 116, and follower chatbot B computer system 118, may communicate with each other over communication system 108. Communication system 108 may include many different types of communication media, now known or later developed. For example, communication system 108 may include communication networks or portions thereof, which implement and/or operably support one or more of the example types of electronic communication between follower chatbot A computer system 116 and follower chatbot B computer system 118 described above. Non-limiting examples may include point-to-point (P2P) or other computer networking architectures or protocols that may communicate over telephony systems; cellular telephone networks, computer wireless fidelity (Wi-Fi) networks; the Internet; internets; intranets; local area network (LAN) systems; Internet Protocol (IP) systems; terrestrial television systems; digital terrestrial television (DTTV) systems; digital television terrestrial broadcasting (DTTB) systems; cable systems; fiber optic systems; microwave systems; asynchronous transfer mode (ATM) systems; frame relay systems; digital subscriber line (DSL) systems; Digital Video Broadcasting (DVB) systems over cable, satellite, terrestrial and mobile networks, and other radio frequency ("RF") systems and satellite systems. In some embodiments, communications over communication system 108 may be over one or more wired communications channels (e.g., twisted pair wiring, optical fiber) and/or wireless communications channels (e.g., radio, microwave, satellite, IEEE 801.11 compliant). Networked communications channels of communication system 108 may include one or more local area networks (LANs), wide area networks (WANs), extranets, intranets, or the Internet including the Worldwide Web portion of the Internet. For example, in one embodiment, messages may be sent between follower chatbot A computer system 116 and leader chatbot computer system 112 over a cellular telephone network while communications between follower chatbot B computer system 118 and leader chatbot computer system 112 may be sent over the Internet via a Wi-Fi connection.

Note that even though only one leader chatbot computer system 112, certified leader chatbot computer system 114, follower chatbot A computer system 116, and follower chatbot B computer system 118 is illustrated in FIG. 1 as an example, there may be multiple follower chatbot, leader chatbot and certified leader chatbot systems that are part of a social framework of chatbots that may communicate over communication system 108.

The above description of the networked environment 102 and the various devices therein, is intended as a broad, non-limiting overview of an example environment in which various embodiments of systems and methods for a chatbot communication framework may be implemented. FIG. 1 illustrates just one example of a networked environment 102, and the various embodiments discussed herein are not limited to such environments. In particular, networked environment 102, and the various devices therein, may contain other devices, systems and/or media not specifically described herein, Example embodiments described herein provide applications, tools, data structures and other support to implement a chatbot communication framework. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described is not limited by the particular order, selection, or decomposition of steps described with reference to any particular module, component, or routine.

Figure 2:
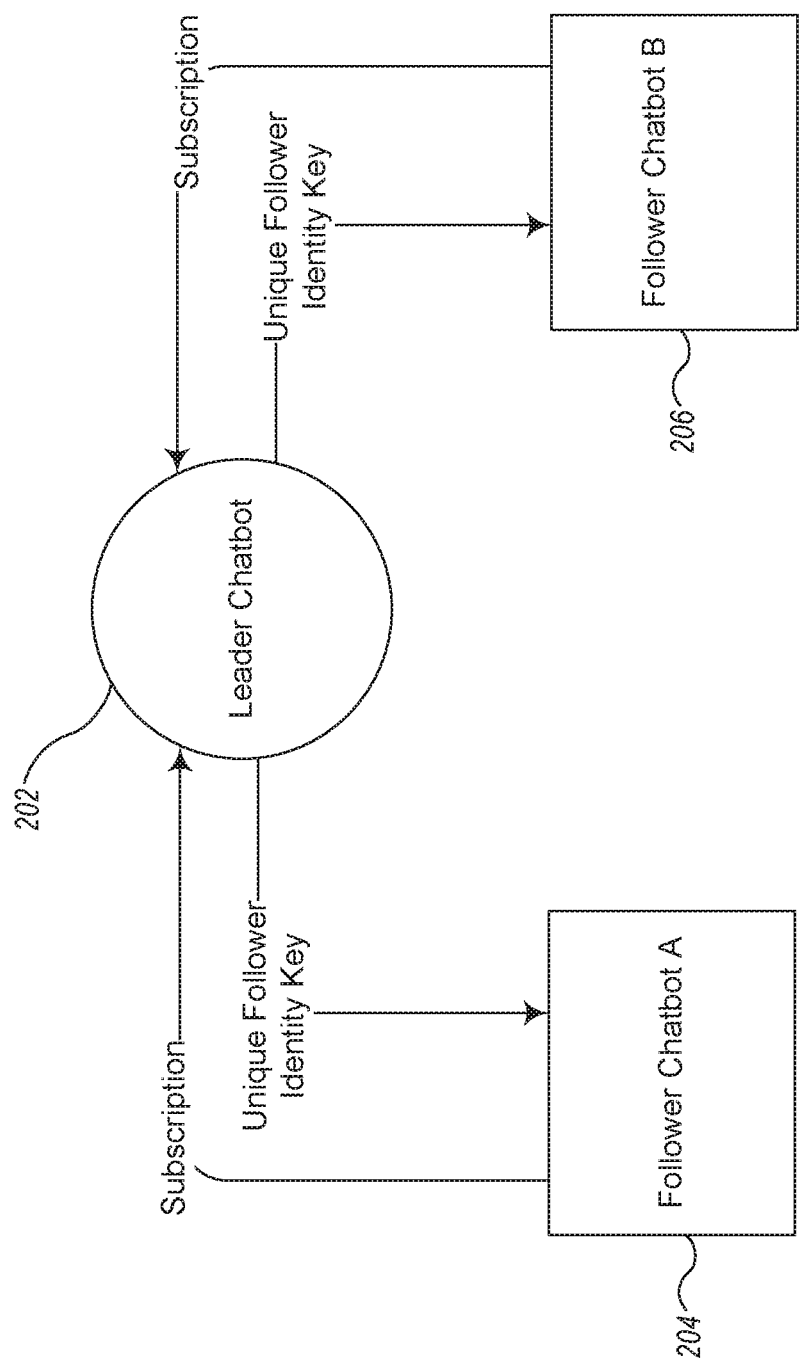
FIG. 2 is a block diagram illustrating example chatbot applications interacting with a leader chatbot system when subscribing to a chatbot communication framework, according to one embodiment.

FIG. 2 is a block diagram illustrating example chatbot applications interacting with a leader chatbot 202 when subscribing to a chatbot communication framework, according to one embodiment. In one embodiment, the follower chatbot messaging applications, such as follower chatbot A 204 and follower chatbot B 206, subscribe to a social framework that comprises a chatbot communication framework via leader chatbot 202. For example, the follower chatbot A 204 and follower chatbot B 206 may use various different types of messaging applications and platforms, including, but not limited to: Facebook® messenger; Instagram®; Whatsapp®; Flixpert®; Wechat®; Line®; Snapchat®; KakaoTalk®; Skype®, other Internet, web-based, instant messaging or chat applications; and/or other wireless mobile device chat or messaging applications.

The leader chatbot 202 stores or has access to the entire set of rules and agreements that are shared across multiple chatbots. The leader chatbot 202 also has default terms and conditions that a chatbot agrees to during subscription. The leader chatbot 202 can block a chatbot detecting to be a malicious or hacker chatbot from communicating with other chatbots subscribed to the social framework. For example, the leader has the ability to give karma to a hacker chatbot (e.g., negative karma in the form of one or more noncompliance points) based on detection of malicious messages, messages with corrupted data or messages from the chatbot otherwise noncompliant with the default terms and conditions. The leader chatbot 202 may include or otherwise has access to a database for storing the unique set of rules received from the follower chatbots, such as follower chatbot A 204 and follower chatbot B 206, unique follower identity keys that are generated by the leader chatbot 202 for each of the follower chatbots upon subscription to the social framework and the defined set of default rules and conditions that are agreed to by the follower chatbots, such as follower chatbot A 204 and follower chatbot B 206, upon subscription to the social framework.

The leader chatbot 202 and the follower chatbots subscribed to the social framework, such as follower chatbot A 204 and follower chatbot B 206, are nodes in a blockchain of a peer-to-peer network associated with the social framework. The blockchain is used by the leader chatbot 202 to authenticate and verify messages sent between various chatbots subscribed to the social framework. The leader chatbot 202 may also use machine learning techniques and artificial intelligence to learn to detect hacker chatbots or otherwise inauthentic or corrupt messages by collecting characteristics of such messages and using them as a training set for detection going forward for future inauthentic, spoofed, phishing, corrupt or other types of messages from hacker chatbots. Using such machine learning techniques as artificial intelligence, the leader chatbot 202 may then update the default terms and conditions accordingly. The leader chatbot may become a certified leader chatbot by passing one or more tests based on artificial intelligence or machine learning techniques to become a certified leader chatbot.

A follower chatbot, such as follower chatbot A 204 or follower chatbot B 206, subscribes to a leader chatbot, such as leader chatbot 202, by agreeing to the default terms and conditions set by the leader. For example, such default terms and conditions may include rules for communication including, but not limited to, rules regarding: content, length of content, type of content, personal information, information identifying a person, contact information, phone numbers, home addresses, email addresses, social security numbers, explicit content, financial information, financial account information, solicitations, advertisements, embedded content, computer viruses, malware, spyware, hate speech, misinformation, corrupt data, multimedia content, communication protocol, message format and message language. A follower chatbot, such as follower chatbot A 204, may share its unique set of rules with the leader, such as leader chatbot 202, which are used by the leader chatbot 202 and/or follower chatbot A 204 to ensure communication to and from that follower adhere to such rules. The follower chatbot, such as follower chatbot A 204 and follower chatbot B 206, are also nodes in the blockchain of the peer-to-peer network associated with the social framework.

When a newly created chatbot is deployed, such as follower chatbot A 204, it authenticates with the leader chatbot 202. This authentication may be, for example, using a one-time token (OTT). The leader chatbot 202 will then check if the new chatbot has met with default standards (i.e., the default terms and conditions). If the new chatbot, such as follower chatbot A 204, has met with the default standards, then another set of unique rules are shared by the follower chatbot to the leader chatbot 202 to prove the follower chatbot's identity and to protect against and avoid identity theft.

A unique follower identity key may be generated by leader chatbot 202 to avoid duplicate chatbots being subscribed to the social framework. This key may be communicated to follower chatbot A 204 for follower chatbot A 204 to use going forward to identify itself on the social framework. The set of unique rules for follower chatbot A 204 may be saved in a database of the leader chatbot 202, such as in the unique set of rules and keys storage 311 shown in FIG. 3. On successful subscription, the leader chatbot 202 tags follower chatbot A 204 as a follower chatbot, and the information regarding follower chatbot A 204 is saved into a database of leader chatbot 202, such as in the unique set of rules and keys storage 311 shown in FIG. 3. The follower chatbot A 204 can now communicate with other follower chatbots subscribed to the social framework, such as follower chatbot B 206.

The communication between chatbots (leader and followers) on the social framework occurs by sending message blocks using blockchain technology. A message block may include the following information: data representing the message to the intended recipient follower chatbot subscribed to the social framework; a hash associated with the message, which is a unique value for use by the leader chatbot and/or intended recipient follower chatbot subscribed to the social framework to decrypt the message using the blockchain; and a previous hash associated with a previous message of the blockchain, which is a unique key associated with the previous message for authenticating the message included in the message block is from the follower chatbot subscribed to the social framework to identify identity thefts using the blockchain.

Using the leader-follower chatbot social framework and blockchain technology described herein, the transmission of corrupt data may be avoided. For example, follower chatbot A 204 may send a message block including a message to an intended recipient follower chatbot subscribed to the social framework, such as follower chatbot B 206. This message is sent via leader chatbot 202 subscribed to the social framework, using the unique key that identifies the follower chatbot A 204 potential follower chatbot as being a follower chatbot subscribed to the social framework and using a blockchain of a peer-to-peer network associated with the social framework. The leader chatbot 202 may then determine whether there is positive consensus from below a threshold percentage (e.g., 50%) of nodes associated with all leader chatbots in the peer-to-peer network associated with the social framework that the message, contained in the received message block from follower chatbot A 204, to the intended recipient follower chatbot, follower chatbot B 206, complies with default standards for subscription to the social framework.

The leader chatbot 202 may assign a noncompliance point to a follower chatbot A 204 based on a determination there is positive consensus from below the threshold percentage of nodes associated with all leader chatbots in the peer-to-peer network that the message contained in the message block complies with default standards for subscription to the social framework. The leader chatbot 202 may then determine whether a total number of noncompliance points assigned to follower chatbot A 204 has exceeded a threshold number of noncompliance points. The leader chatbot 202 may then determine to not deliver the message contained in the received message block to follower chatbot B 206 and unsubscribe the follower chatbot A 204 from the social framework, to block the follower chatbot A 204 from sending further messages to follower chatbots via the social framework, if the total number of noncompliance points assigned to follower chatbot A 204 has exceeded the threshold number of noncompliance points.

Also, the leader chatbot 202 may determine whether there is positive consensus from below a threshold percentage (e.g., 50%) of nodes in the peer-to-peer network that the message contained in the message block is authenticated to be from follower chatbot A 204 based on a hash associated with the message and a previous hash associated with a previous message of the blockchain. For example, the blockchain may be stored in blockchain data storage 315 shown in FIG. 3. The leader chatbot 202 may determine to not deliver the message contained in the message block to the intended recipient follower chatbot B 206 based on a determination that there is positive consensus from below the threshold percentage of nodes based on the hash and previous hash associated with the blockchain. The leader chatbot 202 may assign a noncompliance point to follower chatbot A 204 based on the determination that there is positive consensus from below the threshold percentage of nodes in the peer-to-peer network that the message contained in the message block is authenticated to be from follower chatbot A 204 based on the hash and previous hash associated with the blockchain. Using the process disclosed above, hacker chatbots may be detected, and identity thefts avoided.

Figure 3:
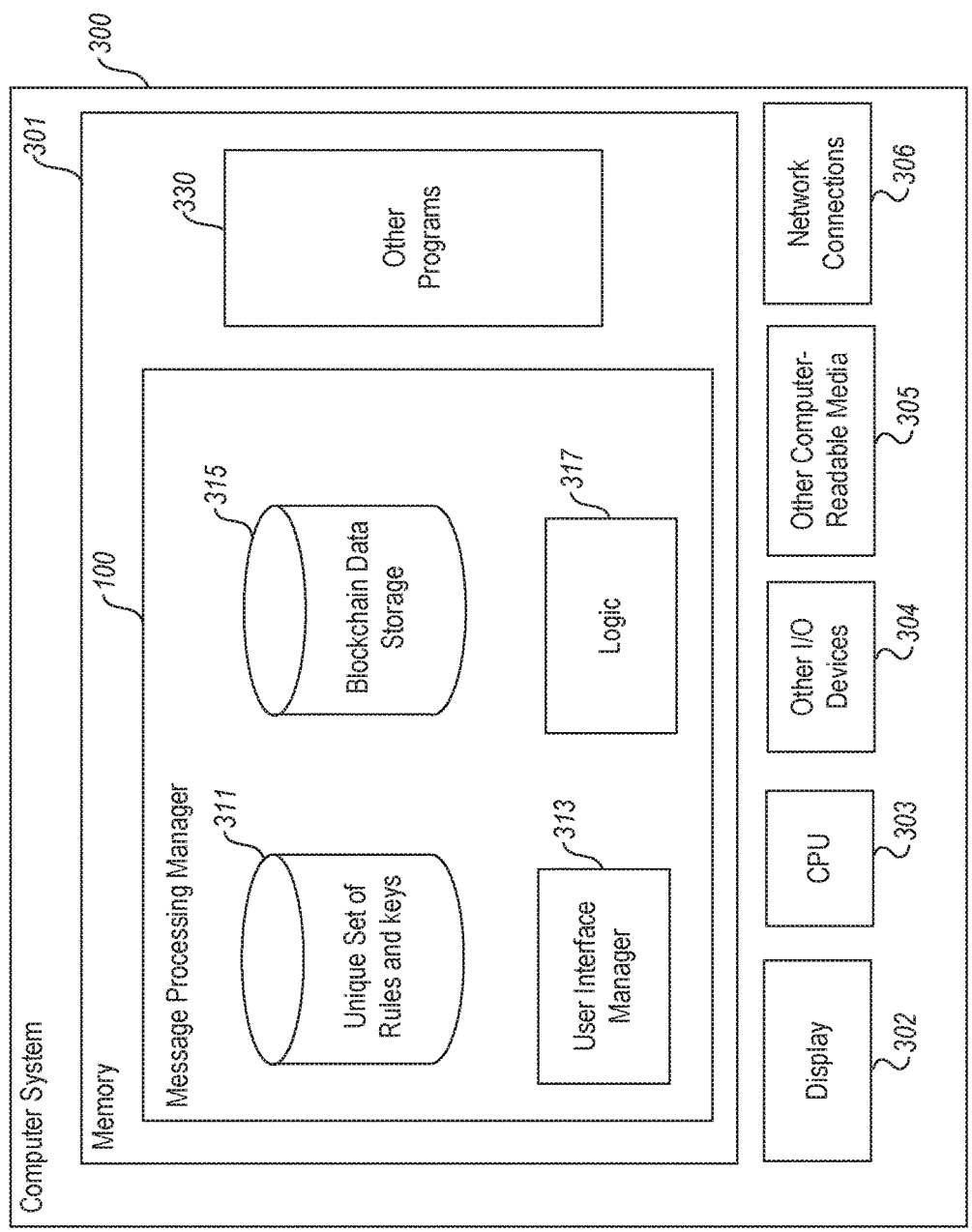
FIG. 3 is a block diagram of a computing system including structure for practicing example embodiments of systems and methods for a chatbot communication framework, according to one embodiment.

FIG. 3 is a block diagram of a computing system 300 including structure for practicing example embodiments of systems and methods for a chatbot communication framework, according to one embodiment. FIG. 3 shows a computer system 300 that may be utilized to implement a message processing manager 100 of follower chatbot A computer system 116 and/or the follower chatbot B computer system 118. However, the same or similar computing system to that of computer system 300, or applicable components of the computer system 300, may be utilized by the leader chatbot computer system 112 and/or the certified leader chatbot computer system 114 to implement the functions of the leader chatbot computer system 112 and certified leader chatbot computer system 114 described herein. In one embodiment, the computer system 300, or applicable portions thereof, is part of an electronic communication device, such as follower chatbot A computer system 116 or follower chatbot B computer system 118. In some embodiments, the computer system 300, or applicable portions thereof, may be part of another computer or device on a peer-to-peer network of the chatbot social framework, such as leader chatbot computer system 112 or certified leader chatbot computer system 114.

The message processing manager 100 implements the processes and algorithms described herein for managing subscriptions to, enforcing rules of and processing messages between subscribers on the chatbot social framework described herein (e.g., using blockchain techniques, artificial intelligence and machine learning as described herein) such as on the various devices shown in FIG. 1. For example, the message processing manager 100 may include or implement components of a text messaging application, chat application, software plug-in, application programming interface (API), blockchain system, artificial intelligence system, machine learning system or other system module that performs the algorithms described herein for managing subscriptions to, enforcing rules of and processing messages between subscribers on the chatbot social framework described herein.

Each device shown in FIG. 1 may have its own version of the message processing manager 100 that implements the processes and algorithms that the respective device performs as described herein. One or more general purpose or special purpose computing systems/devices may be used to implement the message processing manager 100. In addition, the computer system 300 may comprise one or more distinct computing systems/devices, and may span distributed locations. Furthermore, each block shown may represent one or more such blocks as appropriate to a specific embodiment, or may be combined with other blocks. Also, the message processing manager 100 may be implemented in software, hardware, firmware, or in some combination to achieve the capabilities described herein.

In the embodiment shown, computer system 300 comprises a computer memory ("memory") 301, a user interface display 302 (which may be a touchscreen in some embodiments), one or more Central Processing Units ("CPUs") 303, Input/Output devices 304 (e.g., touchscreen, keyboard, mouse, RF or infrared receiving device, CRT or LCD display, and the like), other computer-readable media 305, and network connections 306. Network connections 306 represent the communication modules, interfaces, modems, network adapters, tuners, demodulators, demultiplexers, packet filters, network equipment, etc., of the computer system 300 that are configured and operable to receive data from and interface with the devices of FIG. 1 described herein over communication system 108.

The message processing manager 100 is shown residing in memory 301. In other embodiments, some portion of the contents and some of or all of the components of the message processing manager 100 may be stored on and/or transmitted over the other computer-readable media 305. The components of the message processing manager 100 execute on one or more CPUs 303 and cause the algorithms shown in FIGS. 4-7 and described herein to be performed. The components of the message processing manager 100 also execute on one or more CPUs 303 in a manner to implement the chatbot communication framework according to the algorithms shown in FIGS. 4-7 and described herein.

Other code or programs 330 (e.g., messaging applications, chatbots, operating system, network layer stack, graphics programs, application programming interfaces (APIs) and the like) and potentially other data repositories, also reside in the memory 301, and preferably execute on one or more CPUs 303. Of note, one or more of the components in FIG. 3 may not be present in any specific implementation. For example, some embodiments may not provide other computer readable media 305.

In some embodiments, the message processing manager 100 may include a unique set of rules and keys storage 311, a user interface manager 313, blockchain data storage 315 that includes data representing the blockchain of messages sent via the chatbot communication framework, and logic 317 that includes the program code to implement the processes of the message processing manager 100 described herein. Other and/or different modules may be implemented. The message processing manager 100 may interact via network connections 306 with the other devices shown in FIG. 1 and various other devices not shown in FIG. 1 via the communication system 108 shown in FIG. 1.

The unique set of rules and keys storage 311 stores data representing the unique set of rules for communication with each follower chatbot as well the unique key identifying that follower chatbot that is subscribed to the chatbot social framework (which includes the chatbot communication framework). For example, the computer system 300 may be the leader chatbot computer system 112, which maintains a database in unique set of rules and keys storage 311 of the unique set of rules for communication with each follower chatbot, as well the unique key identifying that follower chatbot that is subscribed to the chatbot social framework in order to implement the processes and algorithms described herein for managing subscriptions to, enforcing rules of and processing messages between subscribers on the chatbot social framework described herein. As another example, the computer system 300 may be the follower chatbot A computer system 116, which stores the unique set of rules for follower chatbot A computer system 116 and the unique key for follower chatbot A computer system 116 for enabling communication with each other chatbot subscribed to the chatbot social framework.

The user interface manager 313 provides a view and a controller that facilitate user interaction with the message processing manager 100, an operating system, other messaging applications, or their various components. For example, the user interface manager 313 provides interactive graphical user interface screens and/or elements that provide the user interface of follower chatbot A 204, follower chatbot B 206 or leader chatbot 202, as applicable. The user interface manager 313 also may provide the user the ability to configure the message processing manager 100 and select unique set of rules as described herein. For example, the user may configure the message processing manager 100 via the interactive graphical user interface to input the default standards for subscription to the social framework. In some embodiments, the message processing manager includes an application program interface ("API") that provides programmatic access to one or more functions of a messaging application or platform. For example, such an API may provide the follower chatbot A computer system 116 a programmatic interface to one or more functions of the follower chatbot A 204 or platform residing on follower chatbot A computer system 116. These may be invoked by one of the other programs 330 or some other module of the follower chatbot A computer system 116. For example, the message processing manager 100 may be invoked or utilized by follower chatbot A 204 or another program managing the overall operation of the follower chatbot A computer system 116. In some embodiments, such an API may provide the leader chatbot computer system 112 a programmatic interface to one or more functions of the follower chatbot A 204 or message processing manager 100 residing on follower chatbot A computer system 116.

In an example embodiment, components or modules of the message processing manager 100 are implemented using standard programming techniques. For example, the message processing manager 100 may be implemented as a "native" executable running on the CPU 303, along with one or more static or dynamic libraries. In other embodiments, the message processing manager 100 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C #, Visual Basic. NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

In a software or firmware implementation, instructions stored in a memory cause, when executed, one or more processors of the computer system 300 to perform the functions of the message processing manager 100. For example, instructions stored in memory when executed by a computer processor modify the data in the same or another memory address space, thus performing the functions of the message processing manager 100. Alternatively, instructions stored in memory when executed by a processor, could modify the control registers of an application specific integrated circuit (ASIC) to configure it to perform the functions of the message processing manager 100. Such an ASIC may directly access and modify the memory of the computer processor without the intervention of the computer processor (DMA operation). In one embodiment, instructions, when executed, cause the CPU 303 or some other processor, such as an I/O controller/processor, to determine whether there is positive consensus, assign one or more noncompliance points when there is no positive consensus, determine to not deliver the message and unsubscribe the follower chatbot when total noncompliance points exceeds maximum. Similarly, the CPU 303 or other processor may be configured to perform other operations such as receiving subscription requests from follower chatbots, determining whether the follower chatbots comply with set standards, receive unique sets of rules from follower chatbots and subscribe follower chatbots to the social framework.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Also, functions could be implemented and/or performed by each component/module, and in different orders, and by different components/modules, yet still achieve the functions of the message processing manager 100. For example, one way (broadcast) and/or two-way (interactive) wide area networks (WAN) may be used for electronic communication. Both types of networks may use storage local to one or more of the devices shown in FIG. 1 and under local control on the local area network (LAN).

In addition, programming interfaces to the data stored as part of the message processing manager 100, such as in the blockchain data storage 315, can be available by standard mechanisms such as through C, C++, C #, and Java APIs; libraries for accessing files, databases, or other data repositories; through scripting languages such as XML; or through Web servers, FTP servers, or other types of servers providing access to stored data. The blockchain data storage 315 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RML, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a message processing manager.

Furthermore, in some embodiments, some or all of the components of the message processing manager 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on, or transmitted/communicated by, various non-transitory or transitory computer-readable mediums (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

One or more of the same or similar computing system and implementation technologies described above with respect to computer system 300 and implementation of the message processing manager 100 may be utilized by any of the devices shown in FIG. 1 to implement the functions of the system for implementing the chatbot communication framework described herein.

Figure 4:
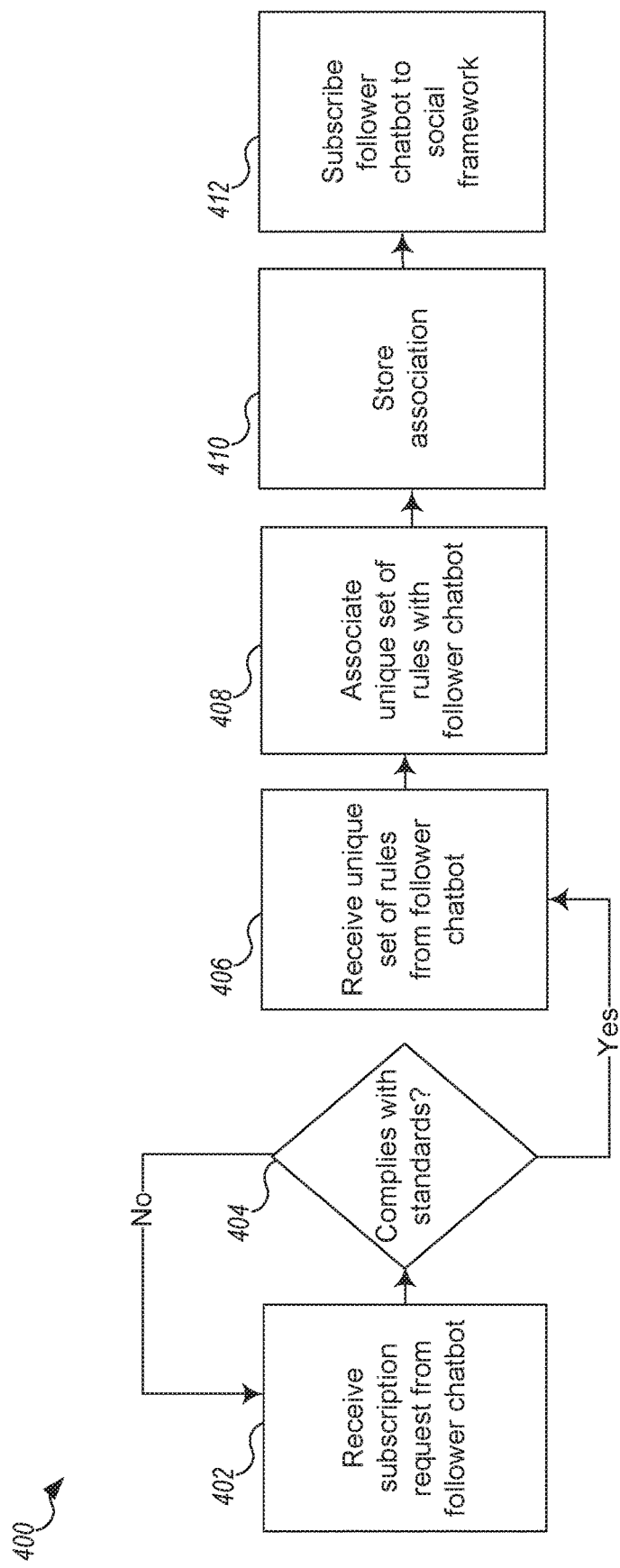
FIG. 4 is a flow diagram of an example method for subscribing a follower chatbot to a chatbot communication framework, according to one embodiment.

FIG. 4 is a flow diagram of an example method 400 for subscribing a follower chatbot to a chatbot communication framework, according to one embodiment.

At 402, the leader chatbot 202 receives a request associated with a potential follower chatbot to subscribe to a social framework of a plurality of follower chatbots and the leader chatbot to communicate with one or more of the plurality of follower chatbots via the leader chatbot, At 404, the leader chatbot 202 determines whether the potential follower chatbot complies with default standards for subscription to the social framework. If the leader chatbot 202 determines that the potential follower chatbot does not comply with the default standards for subscription to the social framework, the process proceeds back to 402 to receive additional subscription requests from other potential follower chatbots. If the leader chatbot 202 determines that the potential follower chatbot does comply with the default standards for subscription to the social framework, the process proceeds to 406.

At 406, the leader chatbot 202 receives a unique set of rules from the potential follower chatbot based on a determination that the potential follower chatbot complies with the default standards for subscription to the social framework.

At 408, the leader chatbot 202 associates the unique set of rules with the follower chatbot.

At 410, the leader chatbot 202 stores the association of the unique set of rules with the follower chatbot for future verification of identity of the potential follower chatbot.

At 412 the leader chatbot 202 subscribes the potential follower chatbot as a follower chatbot to the social framework to enable the follower chatbot subscribed to the social framework to communicate with the one or more of the plurality of the follower chatbots via leader chatbot 202.

Figure 5:
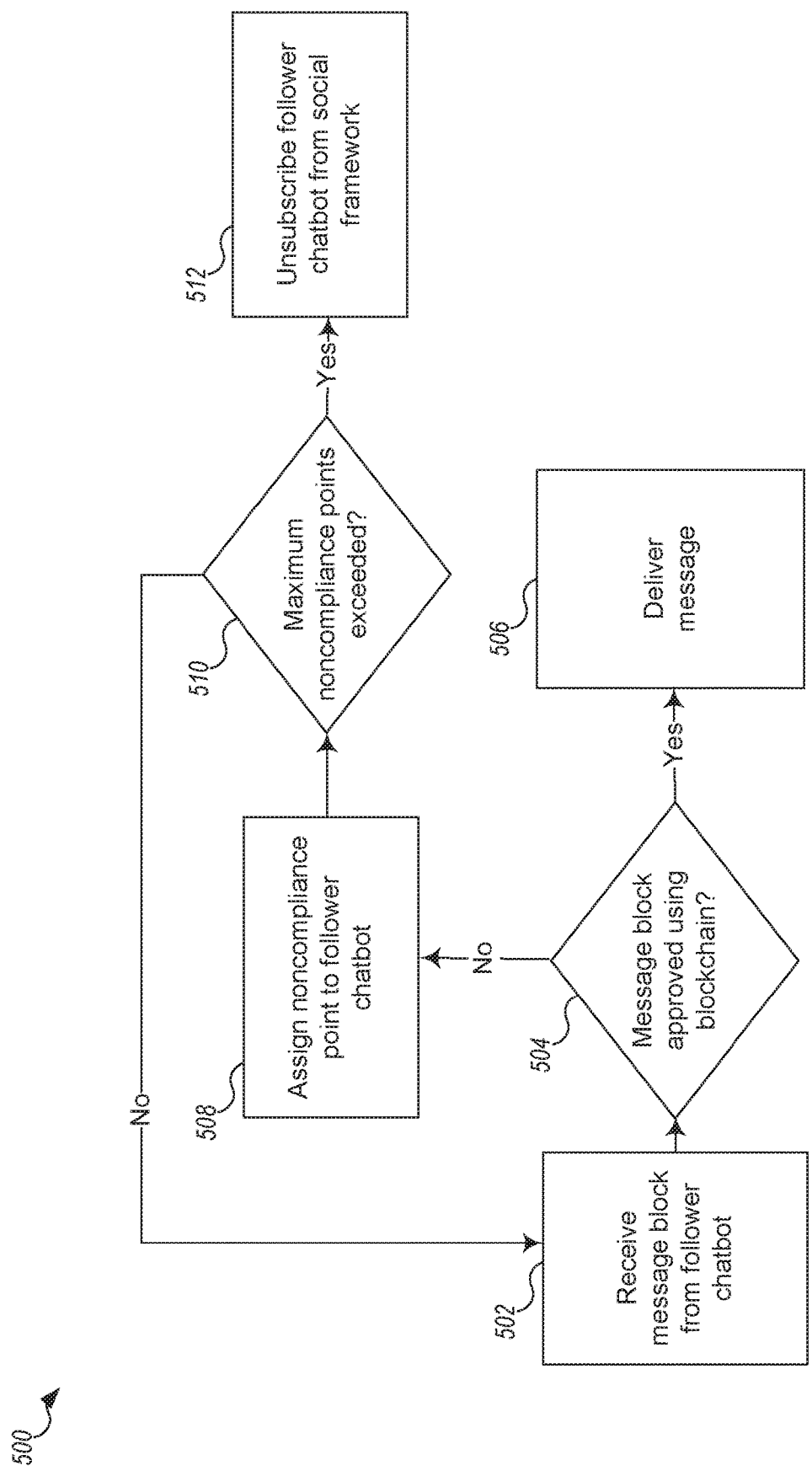
FIG. 5 is a flow diagram of an example method for delivering a message with a chatbot communication framework, according to one embodiment.

FIG. 5 is a flow diagram of an example method 500 for delivering a message with a chatbot communication framework, according to one embodiment.

At 502, leader chatbot 202 receives a message block including a message purported to be from the follower chatbot subscribed to the social framework to an intended recipient follower chatbot subscribed to the social framework, using the blockchain of the peer-to-peer network associated with the social framework.

At 504, leader chatbot 202 determines whether the message block is approved based on the blockchain stored by the various nodes of the chatbot social framework. For example, the leader chatbot 202 may determine whether there is positive consensus from below a threshold percentage of nodes in the peer-to-peer network that the message contained in the message block is authenticated to be from the follower chatbot based on a hash associated with the message and a previous hash associated with a previous message of the blockchain. The leader chatbot 202 may also determine whether there is positive consensus from below a threshold percentage of nodes associated with all leader chatbots in the peer-to-peer network that the message contained in the message block complies with default standards for subscription to the social framework.

At 506, if a determination was made by the leader chatbot 202 that the message block is approved based on the blockchain, then the leader chatbot 202 delivers the message contained in the message block from the follower chatbot to the intended recipient follower chatbot subscribed to the social framework.

At 508, if a determination was made by the leader chatbot 202 that the message block is not approved based on the blockchain, then the leader chatbot 202 assigns a noncompliance point ("negative karma") to the follower chatbot.

At 510, the leader chatbot 202 determines whether a total number of noncompliance points assigned to the follower chatbot has exceeded a threshold number of noncompliance points. If the leader chatbot 202 determines that the total number of noncompliance points assigned to the follower chatbot has exceeded the threshold number of noncompliance points, then the process proceeds to 512. If the leader chatbot 202 determines that the total number of noncompliance points assigned to the follower chatbot has not exceeded the threshold number of noncompliance points, then leader chatbot 202 does not deliver the message, but instead the process proceeds back to 502 to receive additional message blocks.

At 512, the leader chatbot 202 unsubscribes the follower chatbot from the social framework to block the follower chatbot from sending further messages to follower chatbots via the social framework. This is based on the determination that the total number of noncompliance points assigned to the follower chatbot has exceeded the threshold number of noncompliance points.

Figure 6:
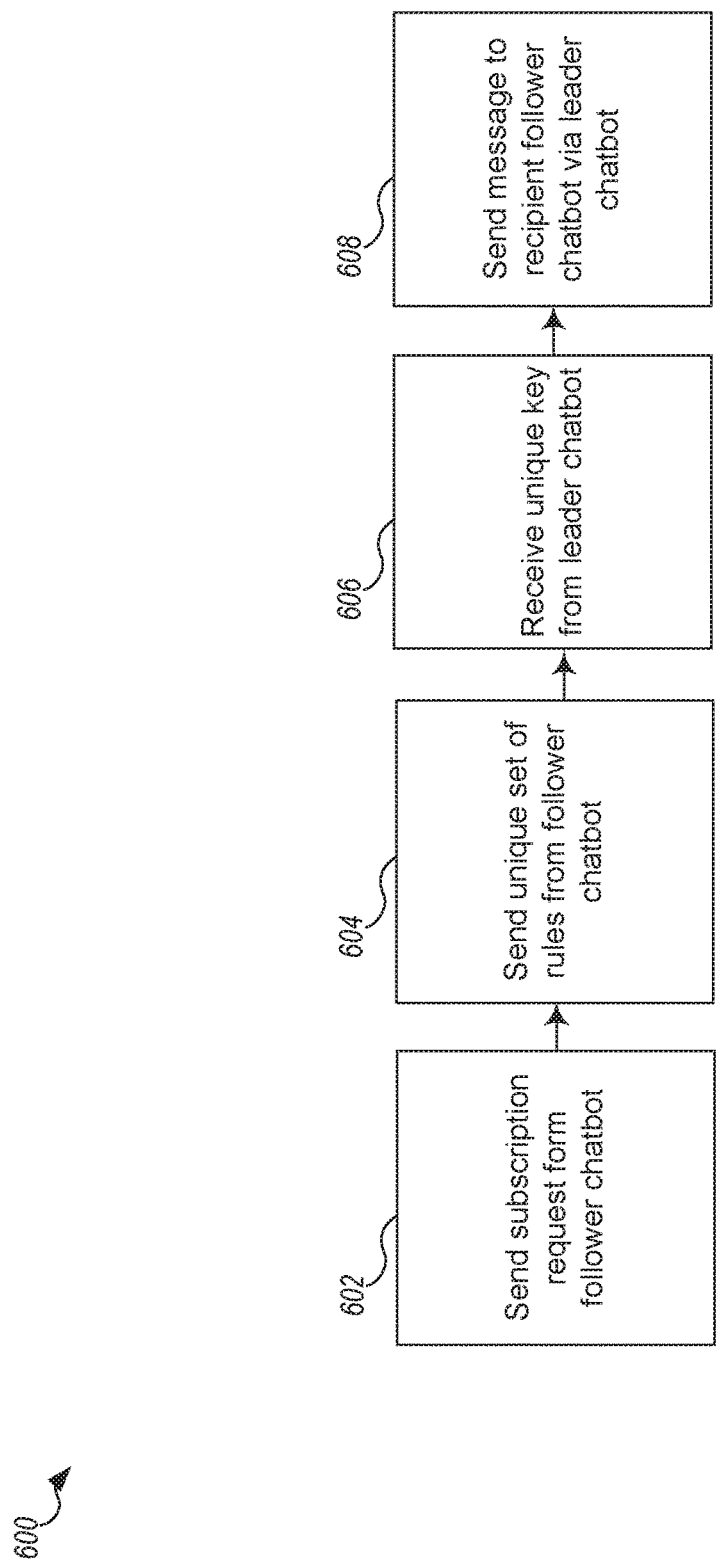
FIG. 6 is a flow diagram of an example method for sending a message from a follower chatbot via a chatbot communication framework, according to one embodiment.

FIG. 6 is a flow diagram of an example method 600 for sending a message from a follower chatbot via a chatbot communication framework, according to one embodiment.

At 602, follower chatbot A 204 sends a request associated with follower chatbot A 204 to subscribe to a social framework of a plurality of follower chatbots and a leader chatbot to communicate with one or more of the plurality of follower chatbots via the leader chatbot.

At 604, in response to a determination by the leader chatbot that follower chatbot A 204 complies with default standards for subscription to the social framework, follower chatbot A 204 sends a unique set of rules to the leader chatbot.

At 606, follower chatbot A 204 receives a unique key associated with follower chatbot A 204 that identifies follower chatbot A 204 as being a follower chatbot subscribed to the social framework, to facilitate avoiding duplicate chatbots being subscribed to the social framework.

At 608, follower chatbot A 204 sends a message block including a message to an intended recipient follower chatbot subscribed to the social framework, via the leader chatbot subscribed to the social framework. This may be performed using the unique key that identifies follower chatbot A 204 as being a follower chatbot subscribed to the social framework and using a blockchain of the peer-to-peer network associated with the social framework.

Figure 7:
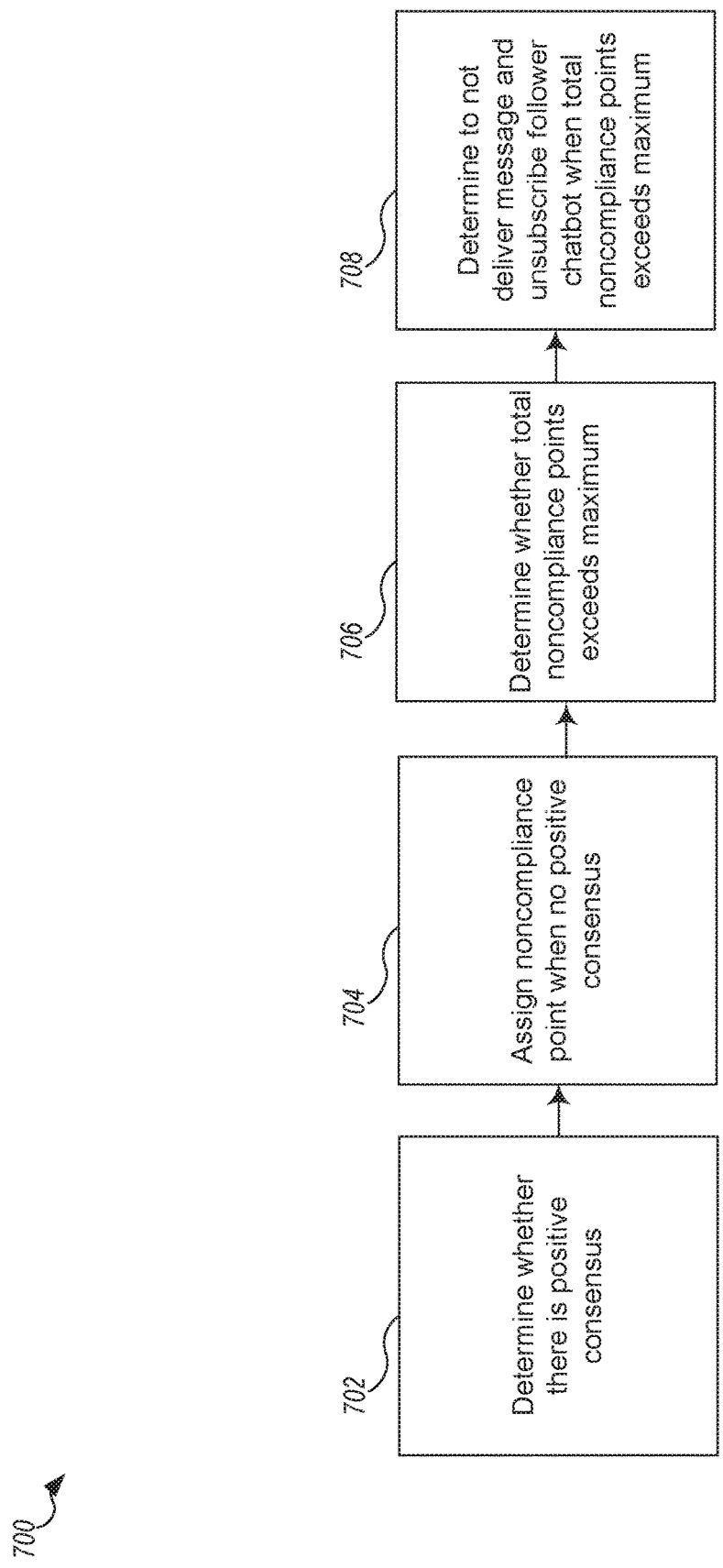
FIG. 7 is a flow diagram of an example method 700 for determining when to unsubscribe a follower chatbot from a chatbot communication framework, according to one embodiment.

FIG. 7 is a flow diagram of an example method 700 for determining when to unsubscribe a follower chatbot from a chatbot communication framework, according to one embodiment.

At 702, leader chatbot 202 determines whether there is positive consensus from below a threshold percentage of nodes associated with all leader chatbots in a peer-to-peer network associated with a social framework that a message, contained in a received message block, to an intended recipient follower chatbot in the in the peer-to-peer network, complies with default standards for subscription to the social framework.

At 704, leader chatbot 202 assigns a noncompliance point to a follower chatbot associated with sending the message block based on a determination there is positive consensus from below the threshold percentage of nodes associated with all leader chatbots in the peer-to-peer network that the message contained in the message block complies with default standards for subscription to the social framework.

At 706, leader chatbot 202 determines whether a total number of noncompliance points assigned to the follower chatbot has exceeded a threshold number of noncompliance points.

At 708, leader chatbot 202 determines to not deliver the message contained in the received message block to the intended recipient follower chatbot and unsubscribes the follower chatbot from the social framework, to block the follower chatbot from sending further messages to follower chatbots via the social framework based on a determination that the total number of noncompliance points assigned to the follower chatbot has exceeded the threshold number of noncompliance points.

While various embodiments have been described hereinabove, it is to be appreciated that various changes in form and detail may be made without departing from the spirit and scope of the invention(s) presently or hereafter claimed.

The invention claimed is:

1. A computer implemented method in an electronic communications system comprising a plurality of chatbots, the method comprising:
   receiving, by at least one computer processor associated with a leader chatbot, a request associated with a potential follower chatbot to subscribe to a social framework of a plurality of follower chatbots and the leader chatbot to communicate with one or more of the plurality of follower chatbots via the leader chatbot;
   determining, by at least one computer processor associated with the leader chatbot, whether the potential follower chatbot complies with default standards for subscription to the social framework;
   receiving, by at least one computer processor associated with the leader chatbot, a unique set of rules from the potential follower chatbot based on a determination that the potential follower chatbot complies with the default standards for subscription to the social framework, wherein the unique set of rules are specifically for identity verification of the follower chatbot and define how the identity of the follower chatbot is to be verified;
   associating, by at least one computer processor associated with the leader chatbot, the unique set of rules with the follower chatbot;
   storing, by at least one computer processor associated with the leader chatbot, the association of the unique set of rules with the follower chatbot for future verification of identity of the potential follower chatbot; and
   subscribing, by at least one computer processor associated with the leader chatbot, the potential follower chatbot as a follower chatbot subscribed to the social framework to enable the follower chatbot subscribed to the social framework to communicate with the one or more of the plurality of the follower chatbots via the leader chatbot.

2. The method of claim 1 wherein the determining whether the potential follower chatbot complies with the default standards for subscription to the social framework includes:
   determining whether a set of defined rules and conditions are agreed to by the potential follower chatbot.

3. The method of claim 1 further comprising:
   before determining whether the potential follower chatbot complies with the default standards for subscription to the social framework, authenticating, by at least one computer processor associated with the leader chatbot, the potential follower chatbot via use of a one-time token provided to the potential follower chatbot.

4. The method of claim 1 further comprising:
   in response to receiving the unique set of rules from the potential follower chatbot, storing, by at least one computer processor associated with the leader chatbot, the unique set of rules from the potential follower chatbot in a database accessible to the leader chatbot as associated with the potential follower chatbot for future verification of identity of the potential follower chatbot after the potential follower chatbot is subscribed to the social framework.

5. The method of claim 1 wherein the subscribing the potential follower chatbot as a follower chatbot subscribed to the social framework includes:
   generating, by at least one computer processor associated with the leader chatbot, a unique key associated with the potential follower chatbot that identifies the potential follower chatbot as being subscribed to the social framework to facilitate avoiding duplicate chatbots being subscribed to the social framework; and
   tagging, by at least one computer processor associated with the leader chatbot, the potential follower chatbot as being subscribed to the social framework using the unique key associated with the potential follower chatbot.

6. The method of claim 1, further comprising:
   receiving, by at least one computer processor associated with the leader chatbot, an indication that the follower chatbot subscribed to the social framework no longer complies with the default standards for subscription to the social framework; and in response to receiving the indication that the follower chatbot subscribed to the social framework no longer complies with the default standards for subscription to the social framework, unsubscribing from the social framework, by at least one computer processor associated with the leader chatbot, the follower chatbot subscribed to the social framework.

7. The method of claim 6 wherein the leader chatbot and the follower chatbot subscribed to the social framework are nodes in a blockchain of a peer-to-peer network associated with the social framework of the plurality of follower chatbots and the leader chatbot.

8. The method of claim 7 wherein the leader chatbot is a certified leader chatbot that was a follower chatbot that became a certified leader chatbot by passing one or more tests based on artificial intelligence or machine learning techniques to become a certified leader chatbot.

9. The method of claim 8, further comprising:
receiving, by at least one computer processor associated with the leader chatbot, a message block including a message purported to be from the follower chatbot subscribed to the social framework to an intended recipient follower chatbot subscribed to the social framework using the blockchain of the peer-to-peer network associated with the social framework;

determining, by at least one computer processor associated with the leader chatbot, using the blockchain of the peer-to-peer network associated with the social framework, whether to deliver a message included in the message block purported to be from the follower chatbot to the intended recipient follower chatbot subscribed to the social framework.

10. The method of claim 9 wherein the determining, using the blockchain of the peer-to-peer network associated with the social framework, whether to deliver the message contained in the message block includes:

determining whether there is positive agreement from below a threshold percentage of nodes associated with all leader chatbots in the peer-to-peer network that the message contained in the message block complies with the default standards for subscription to the social framework; and assigning a noncompliance point to the follower chatbot based on a determination there is positive agreement from below the threshold percentage of nodes associated with all leader chatbots in the peer-to-peer network that the message contained in the message block complies with the default standards for subscription to the social framework;

determining whether a total number of noncompliance points assigned to the follower chatbot has exceeded a threshold number of noncompliance points; and determining to not deliver the message contained in the message block to the intended recipient follower chatbot and unsubscribing the follower chatbot from the social framework to block the follower chatbot from sending further messages to any of the plurality of follower chatbots via the social framework based on a determination that the total number of noncompliance points assigned to the follower chatbot has exceeded the threshold number of noncompliance points.

11. The method of claim 10 wherein the determining, using the blockchain of the peer-to-peer network associated with the social framework, whether to deliver the message contained in the message block further includes:

determining whether there is positive agreement from below a threshold percentage of nodes in the peer-to-peer network that the message contained in the message block is authenticated to be from the follower chatbot based on a hash associated with the message and a previous hash associated with a previous message of the blockchain;

determining to not deliver the message contained in the message block to the intended recipient follower chatbot based on a determination that there is positive agreement from below the threshold percentage of nodes in the peer-to-peer network that the message contained in the message block is authenticated to be from the follower chatbot based on the hash and previous hash associated with the blockchain; and assigning a noncompliance point to the follower chatbot based on the determination that there is positive agreement from below the threshold percentage of nodes in the peer-to-peer network that the message contained in the message block is authenticated to be from the follower chatbot based on the hash and previous hash associated with the blockchain.

12. The method of claim 11 wherein the threshold percentage of nodes in the peer-to-peer network used in determining whether there is positive agreement from below a threshold percentage of nodes in the peer-to-peer network is 50% all nodes in the peer-to-peer network associated with the social framework.

13. The method of claim 10 wherein the threshold number of noncompliance points is three.

14. The method of claim 10 wherein the threshold percentage of nodes associated with all leader chatbots in the peer-to-peer network used in determining whether there is positive agreement from below the threshold percentage of nodes is 50% of all leader chatbots in the peer-to-peer network associated with the social framework.

15. The method of claim 10 wherein the message block includes:
data representing the message purported to be from the follower chatbot;
the hash associated with the message, which is a unique value for use by the recipient follower chatbot subscribed to the social framework to decrypt the message using the blockchain; and
the previous hash associated with the previous message of the blockchain, which is a unique key associated with the previous message for authenticating the message contained in the message block is from the follower chatbot to identify identity thefts using the blockchain.

16. An electronic communications system comprising:
at least one computer processor;
at least one communications module coupled to the at least one computer processor; and
a memory coupled to the at least one computer processor, wherein the memory has computer-executable instructions stored thereon, that when executed, cause the at least one computer processor to:
send a request associated with a potential follower chatbot to subscribe to a social framework of a plurality of follower chatbots and a leader chatbot to communicate with one or more of the plurality of follower chatbots via the leader chatbot;
in response to a determination by the leader chatbot, that the potential follower chatbot complies with default standards for subscription to the social framework, send a unique set of rules from the potential follower chatbot, wherein the unique set of rules are specifically for identity verification of the potential follower chatbot and define how the identity of the potential follower chatbot is to be verified;

receive a unique key associated with the potential follower chatbot that identifies the potential follower chatbot as being a follower chatbot subscribed to the social framework to facilitate avoiding duplicate chatbots being subscribed to the social framework; and send a message block including a message to an intended recipient follower chatbot subscribed to the social framework, via the leader chatbot subscribed to the social framework, using the unique key that identifies the potential follower chatbot as being the follower chatbot subscribed to the social framework and using a blockchain of a peer-to-peer network associated with the social framework.

17. The system of claim 16 wherein the message block includes:

data representing the message to the intended recipient follower chatbot subscribed to the social framework;

a hash associated with the message, which is a unique value for use by the intended recipient follower chatbot subscribed to the social framework to decrypt the message using the blockchain; and a previous hash associated with a previous message of the blockchain, which is a unique key associated with the previous message for authenticating the message included in the message block is from the follower chatbot subscribed to the social framework to identify identity thefts using the blockchain.

18. The system 16 wherein the computer-executable instructions, when executed, further cause the at least one computer processor to:

send an authentication request including a one-time token to the leader chatbot for authentication of the potential follower chatbot to the leader chatbot, wherein the sending the request associated with the potential follower chatbot to subscribe to a social framework is based on the authentication.

19. A non-transitory computer-readable storage medium having computer-executable instructions thereon that, when executed by at least one computer processor, cause at least one computer processor to:

determine whether there is positive agreement from below a threshold percentage of nodes associated with all leader chatbots in a peer-to-peer network associated with a social framework that a message, contained in a received message block, to an intended recipient follower chatbot in the in the peer-to-peer network complies with the default standards for subscription to the social framework, wherein an identity of the intended recipient follower chatbot has been verified according to a unique set of rules specifically for verification of identity of the recipient follower chatbot received from the intended recipient follower chatbot and that define how the intended recipient follower chatbot is to be verified;

assign a noncompliance point to a follower chatbot associated with sending the message block based on a determination there is positive agreement from below the threshold percentage of nodes associated with all leader chatbots in the peer-to-peer network that the message contained in the message block complies with default standards for subscription to the social framework;

determine whether a total number of noncompliance points assigned to the follower chatbot has exceeded a threshold number of noncompliance points; and determine to not deliver the message contained in the received message block to the intended recipient follower chatbot and unsubscribing the follower chatbot from the social framework to block the follower chatbot from sending further messages to follower chatbots via the social framework based on a determination that the total number of noncompliance points assigned to the follower chatbot has exceeded the threshold number of noncompliance points.

20. The non-transitory computer-readable storage medium of claim 19 wherein the computer-executable instructions, when executed by at least one computer processor, further cause at least one computer processor to:

determine whether there is positive agreement from below a threshold percentage of nodes in the peer-to-peer network that the message contained in the message block is authenticated to be from the follower chatbot based on a hash associated with the message and a previous hash associated with a previous message of the blockchain;

determine to not deliver the message contained in the message block to the intended recipient follower chatbot based on a determination that there is positive agreement from below the threshold percentage of nodes in the peer-to-peer network that the message contained in the message block is authenticated to be from the follower chatbot based on the hash and previous hash associated with the blockchain; and assigning a noncompliance point to the follower chatbot based on the determination that there is positive agreement from below the threshold percentage of nodes in the peer-to-peer network that the message contained in the message block is authenticated to be from the follower chatbot based on the hash and previous hash associated with the blockchain.

21. The non-transitory computer-readable storage medium of claim 20 wherein the threshold percentage of nodes in the peer-to-peer network used in determining whether there is positive agreement from below a threshold percentage of nodes in the peer-to-peer network is 50% all nodes in the peer-to-peer network associated with the social framework.

* * * * *